United States Patent
Khurana et al.

(10) Patent No.: US 12,204,964 B2
(45) Date of Patent: Jan. 21, 2025

(54) FACILITATING IMPLEMENTATION OF MACHINE LEARNING MODELS IN EMBEDDED SOFTWARE

(71) Applicant: Adobe Inc., San Jose, CA (US)

(72) Inventors: Sumeet Khurana, New Delhi (IN); Shvet Chakra, Greater Noida (IN); Nipun Poddar, Noida (IN); Naveen Prakash Goel, Noida (IN); Amit Gupta, Noida (IN)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 18/177,636

(22) Filed: Mar. 2, 2023

(65) Prior Publication Data

US 2024/0296302 A1    Sep. 5, 2024

(51) Int. Cl.
  *B41J 2/205*   (2006.01)
  *G06K 15/02*   (2006.01)
  *G06N 20/00*   (2019.01)

(52) U.S. Cl.
  CPC ......... *G06K 15/1836* (2013.01); *G06N 20/00* (2019.01)

(58) Field of Classification Search
  None
  See application file for complete search history.

(56) References Cited

U.S. PATENT DOCUMENTS

| | | | |
|---|---|---|---|
| 2017/0046510 A1* | 2/2017 | Chen | G06F 21/552 |
| 2018/0060709 A1* | 3/2018 | Bermundo | H04N 1/00411 |
| 2020/0247138 A1* | 8/2020 | Furukawa | G06N 20/00 |

* cited by examiner

*Primary Examiner* — Andrew H Lam
(74) *Attorney, Agent, or Firm* — Shook, Hardy & Bacon L.L.P.

(57) ABSTRACT

Methods and systems are provided for facilitating implementation of machine learning models in embedded software. In embodiments, a lean machine learning model, having a limited number of layers, is trained in association with a complex machine learning model, having a greater number of layers. To this end, a complex machine learning model, having a first number of layers, can be trained based on an output generated from a lean machine learning model used as input to the complex machine learning model. Further, the lean machine learning model, having a second number of layers less than the first number of layers, is trained using a loss value generated in association with training the complex machine learning model. Thereafter, the trained lean machine learning model can be provided for implementation in an embedded software.

20 Claims, 11 Drawing Sheets

FACILITATING IMPLEMENTATION OF MACHINE LEARNING MODELS IN EMBEDDED SOFTWARE

BACKGROUND

Embedded software, such as an embedded print raster image processor, is generally used to control specific functions of a non-personal computer device. In this regard, embedded software may have fixed hardware requirements and capabilities. For example, embedded software may be created for the particular device that it runs on, with processing and memory restrictions corresponding to the particular device. Because of resource constraints associated with a particular device, embedded software is oftentimes limited in its functionality. Accordingly, embedded software is generally restricted from using machine learning models due to the resource constraints associated therewith.

SUMMARY

Embodiments described herein are directed to facilitating implementation of machine learning models in embedded software, such as embedded printer RIPs. In this regard, embedded software, such as embedded print RIPs, can leverage machine learning in accordance with embodiments described herein. In particular, memory requirement and time associated with machine learning models is reduced such that machine learning models can be implemented in association with embedded software, such as embedded printer RIPs. In implementation, the memory requirement of a machine learning model is reduced by reducing the model parameters in the training process. To reduce memory utilization by a machine learning model operating in association with embedded software, a lean machine learning model, having a lesser number of layers, is trained in association with a complex machine learning model having a greater number of layers. In this way, the complex machine learning model training leverages the larger number of layers that can create an effective machine learning model, but the lean machine learning model is used at prediction or implementation time such that a reduced numbers of layers are used, thereby utilizing a machine learning model that can be efficiently stored and used at a device with limited resources. For example, a trained lean machine learning model may include only two to three layers to produce output. Further, time associated with implementation of a machine learning model is reduced by applying the machine learning model only on a region of interest. In this way, the efficiency of applying a machine learning model in a resource-limited device is increased, as opposed to applying the machine learning model to an entire content (e.g., image).

DETAILED DESCRIPTION

Figure 1:
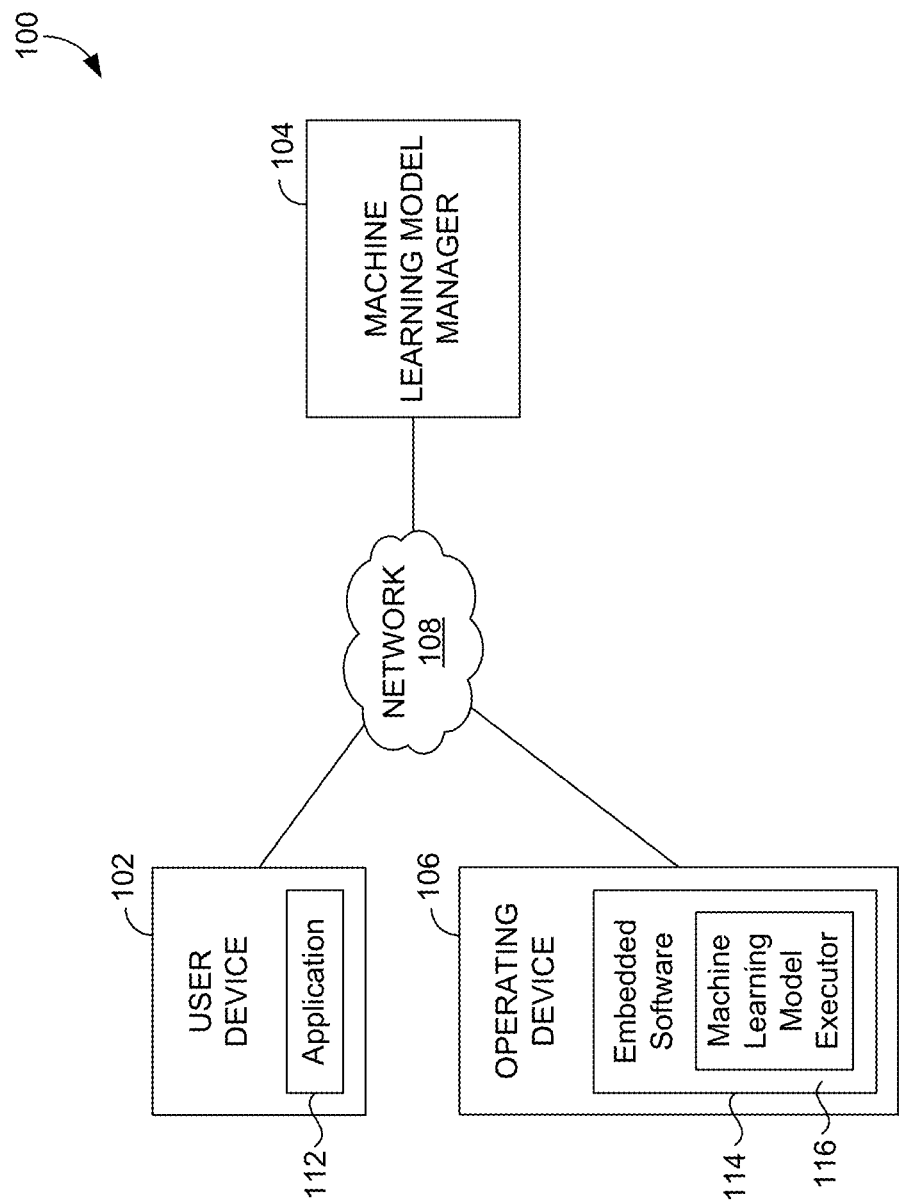
FIG. 1 depicts a diagram of an environment in which one or more embodiments of the present disclosure can be practiced.

Embedded software is generally used to control specific functions of a non-personal computer device. In this regard, embedded software may have fixed hardware requirements and capabilities. For example, embedded software may be created for the particular device that it runs on, with processing and memory restrictions corresponding to the particular device. Because of resource constraints associated with a particular device, embedded software is oftentimes limited in its functionality. To this end, embedded software is generally restricted from using machine learning models due to the resource constraints associated therewith.

One example of embedded software that is restricted from using machine learning models is embedded print raster image processors (RIPs). A raster image processor generally refers to a component used in a printing system that produces a raster image, also referred to as a bitmap. The raster image, or bitmap, is subsequently used to produce the printed output. In operation, a RIP obtains a page description (e.g., in a high-level page description language, such as PostScript, PDF, or XPS) and uses such a page description to produce a raster or bitmap. In some cases, the input may be bitmaps of higher or lower resolution than the output device and, as such, the RIP resizes using an image scaling algorithm. In accordance with generating an appropriate bitmap, the RIP (e.g., a RIP implemented in a printer, such as a laser printer), sends the raster image output for printing (e.g., to the laser). Because of the dearth of random access memory (RAM) (e.g., 256 megabytes (MB)), processing power, and other resource constraints, an embedded RIP is restricted from using a machine learning model(s) for any graphics or image enhancements, or other improvements or alterations to make the print input content print optimized. In particular, the memory requirements of most machine learning models is higher than the total available memory in various printers (e.g., office or enterprise printers). Further, the processing time taken by machine learning models increases overall printing time multi-fold. For example, printers may have 100 pages per minute (PPM) or 10 PPM, but implementing machine learning model on an entire image may hinder the printer speed.

As such, embodiments described herein are directed to facilitating implementation of machine learning models in embedded software, such as embedded printer RIPs. That is, embedded software, such as embedded print RIPs, can leverage machine learning in accordance with embodiments described herein. In particular, memory requirement and time associated with machine learning models is reduced such that machine learning models can be implemented in association with embedded software, such as embedded printer RIPs. In implementation, the memory requirement of a machine learning model is reduced by reducing the model parameters in the training process. Further, time associated with implementation of a machine learning model is reduced by applying the machine learning model only on a region of interest.

In operation, to reduce memory utilization by a machine learning model operating in association with embedded software, a lean machine learning model is trained. A lean machine learning model, as described herein, generally includes a minimal or limited number of layers (e.g., two to three layers). Each layer has certain objectives which it does or performs to learn various features. As limiting the number of layers can impact the quality of the output from a machine learning model, the lean machine learning model is trained in association with a complex learning model. A complex machine learning model having a larger number of layers is valuable to facilitate a machine learning model capable of differentiating inputs such that the machine learning model can appropriately classify or distinguish various types of input. In many cases, however, the parameters of the machine learning model become too extensive such that the overall size of the machine learning model becomes too large, particularly to be implemented in instances that limited memory is available. Because the large number of layers used to perform effectively is oftentimes too great to be able to operate at a device (e.g., printer) with limited resources (e.g., memory), embodiments described herein are directed to training a complex machine learning model and using such a training to facilitate training a lean machine learning model. In this way, the complex machine learning model training leverages the larger number of layers that can create an effective machine learning model, but the lean machine learning model is used at prediction or implementation time such that a reduced numbers of layers are used, thereby utilizing a machine learning model that can be efficiently stored and used at a device with limited resources. For example, a trained lean machine learning model may include only two to three layers to produce output.

During training, loss values are generated in association with the lean machine learning model and the complex machine learning model are used to train machine learning models. In some embodiments described herein, an actor-critic implementation may be used to train the lean machine learning model and the complex machine learning model. Generally, the lean machine learning model and the complex machine learning model are directed to a machine learning model performing a similar functionality. As one example, in the case that an upscaling machine learning model is desired to perform upscaling associated with an image, training both the lean machine learning model and the complex machine learning model includes learning parameters associated with image upscaling. Other examples of functionality desired to be performed by a machine learning model implemented in an embedded software, such as embedded print RIP, include makeup application, blemish remover, object remover, white balance adjuster, exposure and contrast adjuster, color vibrancy and saturation adjuster, image sharpener, blurring application, blending application, or any other editing that may be applied to an image or content before printing.

The trained lean machine learning model can then be used in implementation in association with a resource-constrained device (e.g., a printer). For example, an embedded print RIP in a printer may utilize a trained lean machine learning model to generate a bitmap for use in performing a print function. Advantageously, as the lean machine learning model was trained in association with a complex machine learning model, the lean machine learning model generally provides output that is similar to output that would be generated if the complex machine learning model was used.

To operate in an even more efficient manner to further reduce resources and time associated with application of a machine learning model, the lean machine learning model may be selectively applied. For example, assume an image is provided as input. In such a case, the lean machine learning model may be applied to a portion of the image. Stated differently, a machine learning model may be applied only on a selected region of an input image. In various implementations, a default operation may be applied on the remaining portion of the input (e.g., the unselected portion of the image). In this regard, the efficiency of applying a machine learning model in a resource-limited device is increased, as opposed to applying the machine learning model to an entire content (e.g., image).

Turning to FIG. 1, FIG. 1 is a diagram of an environment 100 in which one or more embodiments of the present disclosure can be practiced. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory as further described with reference to FIG. 11.

It should be understood that operating environment 100 shown in FIG. 1 is an example of one suitable operating environment. Among other components not shown, operating environment 100 includes a user device 102, a machine learning model manager 104, an operating device 106, and a network 108. Each of the components shown in FIG. 1 may be implemented via any type of computing device, such as one or more of computing device 1100 described in connection to FIG. 11, for example. These components may communicate with each other via network 108, which may be wired, wireless, or both. Network 108 can include multiple networks, or a network of networks, but is shown in simple form so as not to obscure aspects of the present disclosure. By way of example, network 108 can include one or more wide area networks (WANs), one or more local area networks (LANs), one or more public networks such as the Internet, and/or one or more private networks. Where network 108 includes a wireless telecommunications network, components such as a base station, a communications tower, or even access points (as well as other components) may provide wireless connectivity. Networking environments are commonplace in offices, enterprise-wide computer networks, intranets, and the Internet. Accordingly, network 108 is not described in significant detail.

It should be understood that any number of devices, servers, and other components may be employed within operating environment 100 within the scope of the present disclosure. Each may comprise a single device or multiple devices cooperating in a distributed environment.

User device 102 can be any type of computing device capable of being operated by an entity or user communicating with the operating device 106. In some implementations, user device 102 is the type of computing device described in relation to FIG. 11. By way of example and not limitation, a user device may be embodied as a personal computer (PC), a laptop computer, a mobile device, a smartphone, a tablet computer, a smart watch, a wearable computer, a personal digital assistant (PDA), an MP3 player, a global positioning system (GPS) or device, a video player, a handheld communications device, a gaming device or system, an entertainment system, a vehicle computer system, an embedded system controller, a remote control, an appliance, a consumer electronic device, a workstation, any combination of these delineated devices, or any other suitable device.

The user device 102 can include one or more processors, and one or more computer-readable media. The computer-readable media may include computer-readable instructions executable by the one or more processors. The instructions may be embodied by one or more applications, such as application 112 shown in FIG. 1. Application 112 is referred to as a single application for simplicity, but its functionality can be embodied by one or more applications in practice.

The application(s) may generally be any application capable of facilitating the exchange of information between the user device 102 and the operating device 106 and/or machine learning model manager 104 in carrying out embodiments described herein. In some implementations, the application(s) comprises a web application, which can run in a web browser, and could be hosted at least partially on the server-side of environment 100. In addition, or instead, the application(s) can comprise a dedicated application, such as an application being supported by the user device 102 and/or operating device 106. In some cases, the application is integrated into the operating system (e.g., as a service). It is therefore contemplated herein that "application" be interpreted broadly.

In accordance with embodiments herein, the application 112 can facilitate communication with the operating device 106 at which an operation, including a machine learning model operation, is performed. For example, user device 102 may provide input (e.g., content, such as text and/or images) for which to print. Such input can be of any format and size. As one example, input may include a page description in a high-level page description language (e.g., PostScript, PDF, or XPS) associated with content desired to be printed. Although, in some embodiments, a user device 102 may provide data desired to be printed, embodiments described herein are not limited hereto. For example, in some cases, an indication of content may be provided via the user 102 and, in such cases, the operating device 106 may obtain such data from another data source (e.g., a data store). In some cases, the user device 102 may also provide training data to the machine learning model manager 104 for use in training a machine learning model.

The machine learning model manager 104 is generally configured to manage generation or training of a machine learning model(s), such as a lean machine learning model and/or a complex machine learning model. In this regard, the machine learning model manager 104 generally trains a model(s) to perform an operation associated with the operating device 106. The machine learning model(s) can be of any type of form and is not intended to be limited herein. As one example, in embodiments in which the operating device 106 is a printer, the machine learning model manager 104 can be used to train any type of model associated with printing functionality.

As described herein, the machine learning model manager 104 facilitates implementation of a lean machine learning model at the operating device 106 by reducing model parameters in the training process such that the trained lean machine learning model has a reduced number of model parameters while maintaining a quality output of a complex machine learning model. In this regard, the machine learning model manager 104 can train a lean machine learning model and a complex machine learning model. The lean machine learning model and the complex machine learning model are generally intended to perform a same or similar functionality (e.g., upscale images). Lean machine learning models and complex machine learning models may be of various types of machine learning models having layers.

As described herein, a loss function is generally used to measure the difference between content representations and, thereafter, the machine learning model(s) is trained or optimized to reduce this difference, or distance. Stated differently, the machine learning model(s), or portions thereof, can be trained by evaluating loss to determine any errors or discrepancies. In some embodiments, updating or training the model involves feeding errors back through the model so the algorithm can adjust parameters in order to reduce the value of the error. For example, backpropagation can be applied to a machine learning model, such as a lean machine learning model and a complex machine learning model, to train the model(s) to optimize such that the model can no longer differentiate real data (the ground truth) and machine-generated data (output from machine learning model) because the data is generally indistinguishable from one another.

The process of training both the lean machine learning model and the complex machine learning model continues, for example, until the lean machine learning model performs similarly or as near effectively to the complex machine learning model. In this way, a lean machine learning model is trained in such a way such that the trained model is small enough to be utilized in an embedded software, such as an embedded RIP, but has the capabilities to perform similarly to a complex machine learning model.

In accordance with obtaining a trained lean machine learned model, the trained lean machine learned model can be provided to the operating device 106 (e.g., a printer or other device incorporating embedded software). The operating device 106 can then implement the trained lean machine learned model to perform functionality associated with the operating device 106. In this regard, an embedded software 114, such as embedded print RIP, can implement the trained lean machine learned model, for example, via a machine learning executor 116. As described, as the lean machine learning model has a reduced or limited number of model parameters, the memory requirements of the machine learned model is reduced, thereby permitting operation of the lean machine learning model on the operating device 106 having limited total memory availability.

Further, as described herein, the operating device 106 can implement the lean machine learning model in association with a portion of data such that the execution of the lean machine learning model occurs in a shorter period of time than if executed on the entire data set. For example, assume the lean machine learning model is related to a printing function associated with content, such as an image. In such a case, a region of interest (ROI) associated with the content may be identified. Thereafter, the lean machine learning model may be applied to content within the region of interest.

Upon applying the lean machine learning model, for example, via the machine learning model executor 116, output may be provided. In an example that the embedded software 114 is an embedded print raster image processer, the machine learning model executor 116 can facilitate generation of a raster image or bitmap. A raster image, or bitmap, is subsequently used to produce the printed output. As such, in accordance with generating an appropriate bitmap, the embedded software 114 can output or communicate the raster image output for printing (e.g., to the laser) of the operating device 106. In this regard, the output associated with the lean machine learning model is used by the operating device 106 to perform a function (e.g., associated with the operating device, such as a printer). Alternatively or additionally, the output of the lean machine learning model may be provided to the user device 102 or other component or system, for example, for output via a display screen or analysis of such output.

Figure 2:
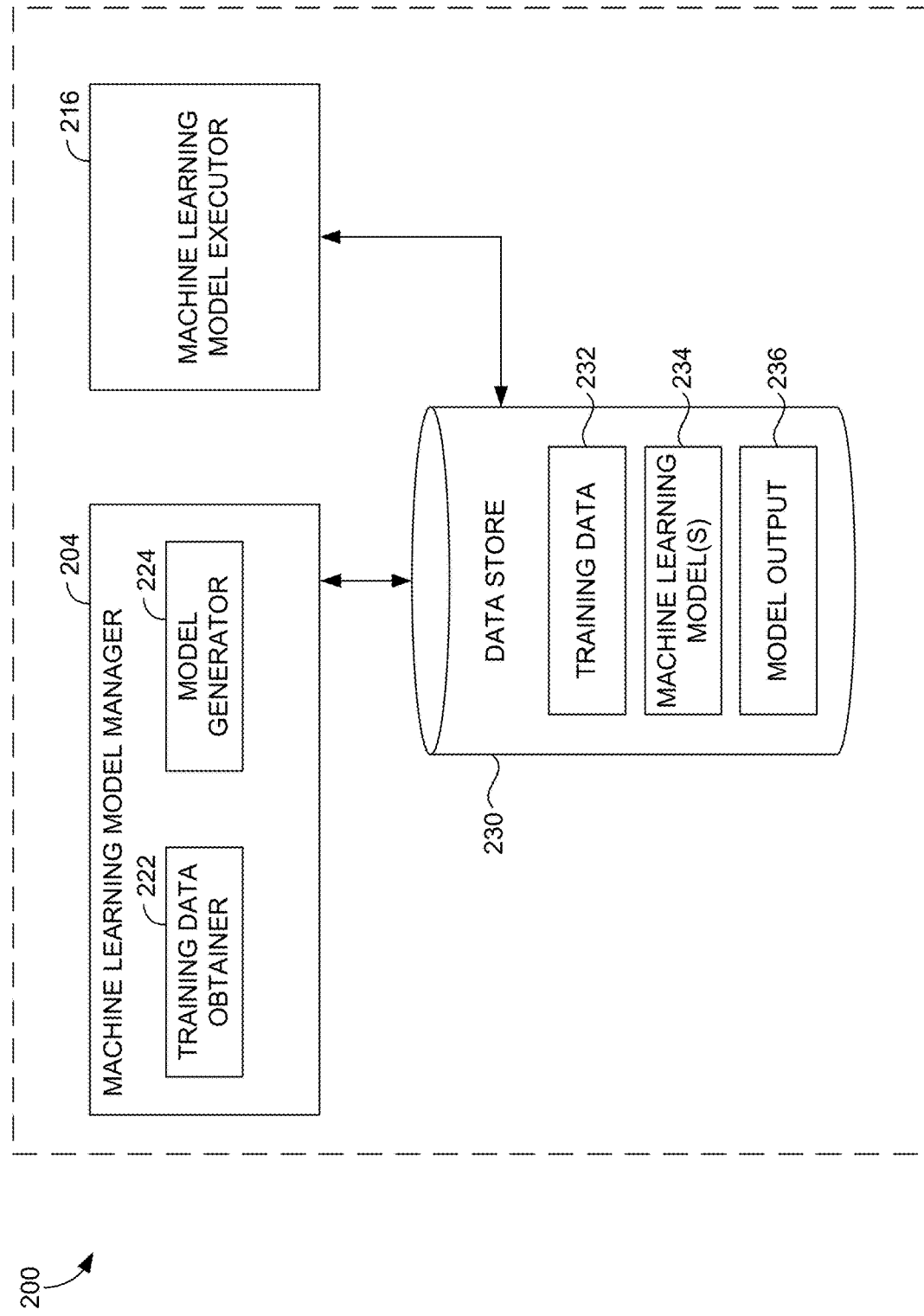
FIG. 2 depicts an illustrative implementation for facilitating implementation of machine learning models in embedded software, in accordance with various embodiments of the present disclosure.

Referring to FIG. 2, aspects of an illustrative implementation 200 are shown, in accordance with various embodiments of the present disclosure. As shown, illustrative implementation 200 includes machine learning model manager 204, machine learning model executor 216, and data store 230. The foregoing components can be implemented, for example, in operating environment 100 of FIG. 1. For example, the machine learning model manager 204 may correspond with machine learning model manager 104 of FIG. 1. The machine learning model manager 204 may be or include a server or computing device for performing training that is remote from a user device and/or operating device. The machine learning model executor 216 may correspond with machine learning model executory 116 of FIG. 1, executing on an operating device, such as operating device 106 (e.g., a printer).

Data store 230 can store computer instructions (e.g., software program instructions, routines, or services), data, and/or models used in embodiments described herein. In some implementations, data store 230 stores information or data received via the various components of machine learning model manager 204 and/or machine learning model executor 216 and provides the various components with access to that information or data, as needed. Although depicted as a single component, data store 230 may be embodied as one or more data stores. Further, the information in data store 230 may be distributed in any suitable manner across one or more data stores for storage (which may be hosted externally). For example, a portion of data store may correspond with a server hosting the machine learning model manager 204 and a portion of the data store may correspond with an operating device hosting the machine learning model executory 216.

In embodiments, data stored in data store 230 includes training data 232. Training data generally refers to data used to train a machine learning model(s) (e.g., a lean machine learning model and/or a complex machine learning model), or portion thereof. As such, training data 232 can include an original dataset, a ground-truth dataset, and/or the like. Training data 232 can be obtained from any number of components, devices, or other data stores (e.g., in the cloud) containing original datasets and/or ground-truth datasets. In this way, machine learning model manager 204 may obtain training data and store such data in the data store 230.

Data store 230 can also be used to store machine learning model(s) 234, such as a lean machine learning model and/or a complex machine learning model, or a portion(s) thereof. Data store 230 may also store model output 236, which may include any output. Any other data computed by or used by machine learning model(s) 234, and/or aspects associated therewith, may be stored in data store 230 or any other data store accessible to the machine learning model manager 204 and/or the machine learning model executor 216.

Machine learning model manager 204 is generally configured to train machine learning models, such as a lean machine learning model and a complex machine learning model. In embodiments, the lean machine learning model is trained in association with the complex machine learning model. Such a lean machine learning model can be used to perform machine learning in an embedded application (e.g., via machine learning executor model 216).

In accordance with embodiments described herein, the machine learning model manager 204 is generally configured to train a lean machine learning model in accordance with training a complex machine learning model. A lean machine learning model generally refers to machine learning model that has a lesser or minimal number of layers (e.g., two to three layers). On the other hand, a complex machine learning model generally refers to a machine learning model that includes a greater number (e.g., significantly greater number) of layers than the lean machine learning model. As described herein, the lean machine learning is trained based on training a complex machine learning model. Generally, the lean machine learning model and the complex machine learning model are directed to a machine learning model performing a similar functionality. As one example, in the case that an upscaling machine learning model is desired to perform upscaling associated with an image, training both the lean machine learning model and the complex machine learning model includes learning parameters associated with image upscaling.

As can be appreciated, a general architecture of a machine learning model includes various layers that learn various features over the layers to generate an output. Each layer has certain objectives which it does or performs. Input is provided through the layers and parameters are optimized or learned in association with the various layers. In many cases, the parameters of the machine learning model become too extensive such that the overall size of the machine learning model becomes too large, particularly to be implemented in instances that limited memory is available. A larger number of layers, however, is valuable to facilitate a machine learning model capable of differentiating inputs such that the machine learning model can appropriately classify or distinguish various types of input. Because the large number of layers used to perform effectively is oftentimes too great to be able to operate at a device (e.g., printer) with limited resources (e.g., memory), embodiments described herein are directed to training a complex machine learning model and using such a training to facilitate training a lean machine learning model. In this way, the complex machine learning model training leverages the larger number of layers that can create an effective machine learning model, but the lean machine learning model is used at prediction or implementation time such that a reduced numbers of layers are used, thereby utilizing a machine learning model that can be efficiently stored and used at a device with limited resources. For example, a trained lean machine learning model may include only two to three layers to produce output.

As depicted in FIG. 2, machine learning model manager 204 includes a training data obtainer 222 and a model generator 224. As can be appreciated, the functionality described in association therewith can be performed by any number of components. For example, the model generator 224 may include separate components associated with training a lean machine learning model and training a complex machine learning model.

The training data obtainer 222 is generally configured to obtain training data. Training data generally refers to any type of data used to train a machine learning model, or models associated therewith (e.g., lean machine learning model and/or complex machine learning model). Training data may vary depending on the functionality to be performed by a machine learning model. For instance, training datasets may include images, such as low resolution images (e.g., target small dots per inch (DPI) images because in office printing domain, differences are minimal for higher resolution images. As described herein, training data may include, by way of example, an original set of data, a ground truth set of data, etc.

An original dataset generally refers to a set of data for which a machine learning model(s) is to be applied for training. An original dataset can be of any format and size. As one example, an original data set may include content (e.g., images for printing), and/or data representations thereof (e.g., pixel values, etc.). A ground truth dataset generally refers to a target, expected, or actual data for training or validating a model. Ground truth data may be any type of data, such as content (images for printing), and/or data representations thereof. In some cases, ground truth labels for datasets are annotated manually by a group of annotators.

A training dataset may be obtained in any number of ways. As one example, a user or managing device may provide a training dataset. As another example, an indication of a training dataset may be provided and, in such cases, the training data obtainer 222 may obtain such data from another data source (e.g., a data store). Such training data may be obtained in accordance with training a machine learning model, and/or portions thereof. By way of example only, assume a particular function is desired to be performed via a machine learning model(s) (e.g., image upsampling). In such a case, a manager, developer, or administrator may select training data associated with upsamplings. As another example, based on a selection to perform image upsamplings, the training data obtainer 222 may obtain relevant or corresponding training data (e.g., via a data store). In other cases, such training data may be obtained automatically (e.g., in accordance with expiration of a time duration or on a periodic basis, etc.). Training data 232 may be stored or captured in a data store, such as data store 230. As can be appreciated, any number of training data can be collected and/or used to train a machine learning model(s), such as a lean and/or complex machine learning model.

In some cases, the training data obtainer 222 analyzes or identifies particular training data for use in training a machine learning model(s). For example, an original dataset may be obtained and analyzed to identify portions of data for use in training the model(s). Such selected data can then be used to extract features for use in training the model(s). For example, specific data may be extracted or identified and used, or removed, for training a machine learning model(s) to perform a certain functionality. In some embodiments, the training data obtainer 222 may pre-process data for use in performing the training. For instance, in some cases, an original dataset, or portion thereof, may be normalized.

The model generator 224 is generally configured to generate or train a machine learning model(s). As described herein, the model generator 224 trains a lean machine learning model and/or a complex machine learning model. The lean machine learning model and the complex machine learning model are generally intended to perform a same or similar functionality (e.g., upscale images).

Lean machine learning models and complex machine learning models may be of various types of machine learning models having layers. By way of example only, and without limitation, such machine learning models may be in the form of binary classification models (e.g., logistic regression), a multiclass classification model (e.g., multinomial logistic regression), or regression model (e.g., linear regression). These are only example machine learning models and embodiments described herein are not intended to be limited herein.

In embodiments, various machine learning techniques may be used to train machine learning models, such as lean machine learning models and complex machine learning models. As described herein, a loss function is generally used to measure the difference between data or content representations and, thereafter, the machine learning model(s) is trained or optimized to reduce this difference, or distance. Stated differently, the machine learning model(s), or portions thereof, can be trained by evaluating loss to determine any errors or discrepancies. Errors can include inaccuracies, flaws, variations, and/or divergences between the training output and the desired output, often referred to as the ground-truth or output if the model or network was perfectly trained. This desired output may be reflected in the training data, or a portion thereof, and used for comparison with the training output. In some embodiments, updating or training the model involves feeding errors back through the model so the algorithm can adjust parameters in order to reduce the value of the error. For example, backpropagation can be applied to a machine learning model, such as a lean machine learning model and a complex machine learning model, to train the model(s) to optimize such that the model(s) can no longer differentiate real data (the ground truth) and machine-generated data (output from machine learning model) because the data is generally indistinguishable from one another. Any type of objective or loss function may be used in association with the machine learning model(s) to train the model.

In one example implementation, a lean machine learning model takes an initial input and provides a lean output. As described, the lean output, which may also be referred to as an intermediate output, is generated using the minimal set of layers of the lean machine learning model. The lean output is then provided as an input to the complex machine learning model, which generates a complex output. In this regard, the complex machine learning model may generate a complex output using a more extensive number of layers, such as twenty or more layers. In some cases, a ground truth is also input into a machine learning network, such as a pre-trained machine learning network to generate a pre-trained output. A loss function(s) is used to identify loss and train the lean machine learning model and/or the complex machine learning model. As can be appreciated, in some cases, a same loss function may be used to train both the lean machine learning model and the complex machine learning model. In other cases, different loss functions may be used to train lean machine learning model and the complex machine learning model.

In one embodiment, the lean output and the ground truth are compared by a loss function to identify loss and train the lean machine learning model. In this way, the loss values associated therewith are provided to the lean machine learning model to train or update the parameters of the lean machine learning model. To train the complex machine learning model, the complex output and the pre-trained output are compared by a loss function (e.g., a same or different loss function) to identify loss. To this end, the loss values associated therewith are provided to the complex machine learning model to train or update the parameters of the complex machine learning model. As described herein, in some implementations, an actor-critic algorithm is implemented to train the lean and complex machine learning models.

The process continues to train the machine learning models, for example, until output of the complex model converges to, or is similar to, output of the pre-trained model and output of the lean model converges to, or is similar to, the ground truth (e.g., original image). In this way, a lean machine learning model is trained in such a way such that the trained model is small enough to be utilized in an embedded software, such as an embedded RIP, but has the capabilities to perform similarly to a complex machine learning model. In cases in which an actor-critic algorithm is employed, training may continue until the actor and critic attain convergence or other success criterion (or a maximum number of episodes is reached). Such a convergence may be attained when loss values for both the actor and critic stabilize.

Figure 3:
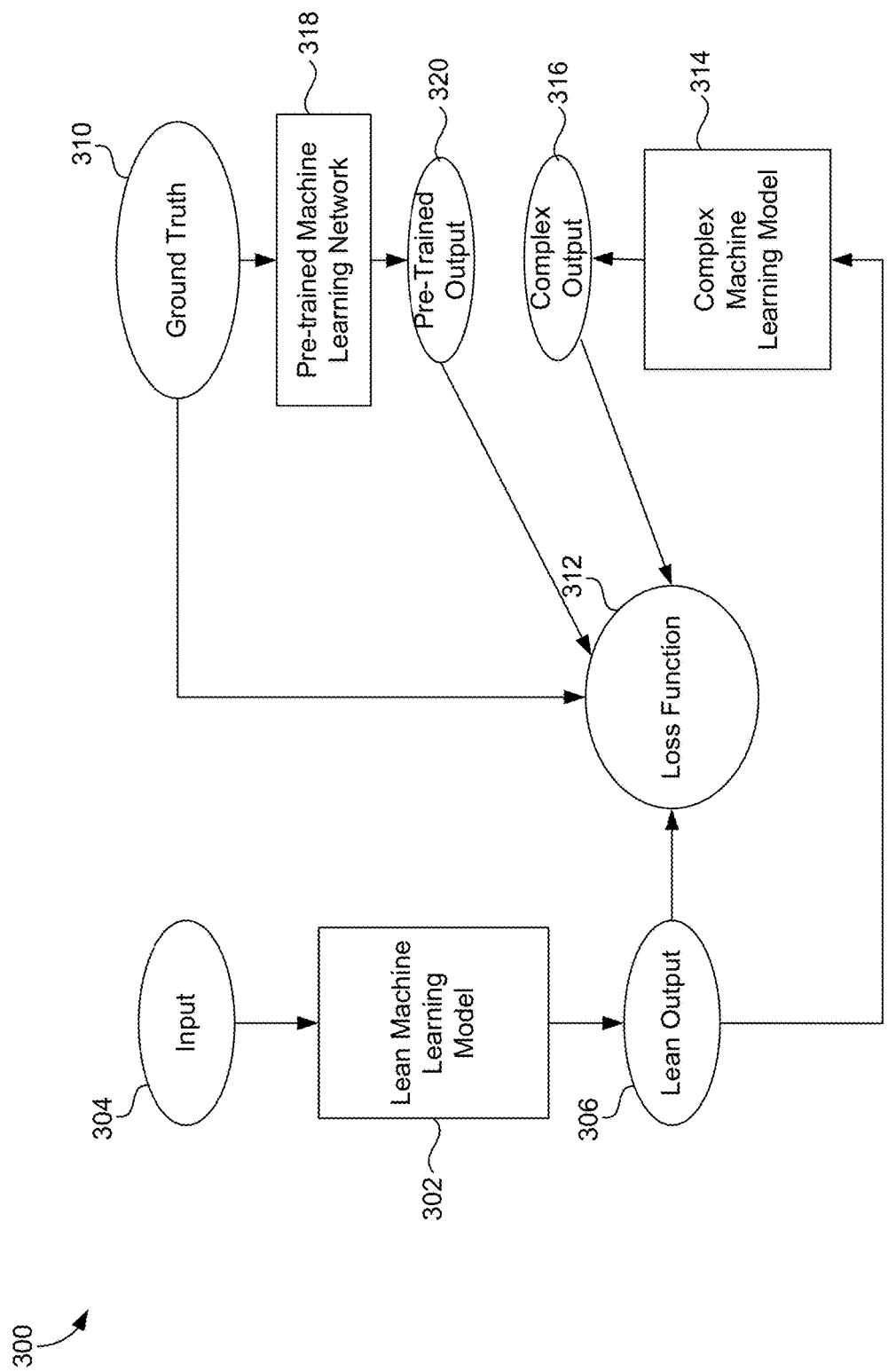
FIG. 3 depicts aspects of an example process flow for training machine learning models, in accordance with various embodiments of the present disclosure.

Turning to FIG. 3, FIG. 3 provides one example 300 of an embodiment used for training to reduce model parameters, thereby reducing memory requirements. As shown in FIG. 3, a lean machine learning model 302 takes an initial input 304 and provides a lean output 306. Although not shown, the lean machine learning model 302 includes a set of layers, generally limited in number such as two to three layers. The lean output 306 and a ground truth 310 is provided to the loss function 312 for identifying loss associated with the lean machine learning model 302. The loss is backpropagated to the lean machine learning model 302 to train or update the parameters of the lean machine learning model 302.

The lean output 306 is also provided as an input to the complex machine learning model 314, which generates a complex output 316. The complex machine learning model 314 generally includes a more extensive number of layers as compared to the lean machine learning model 302. In this regard, the complex machine learning model 314 may generate a complex output using a complex set of layers, such as twenty or more layers. Ground truth 310 is also input into a pre-trained machine learning network 318 to generate a pre-trained output 320. As described herein, a pre-trained machine learning network generally includes static weights, that is, the weights are not changed are modified. The complex output 316 and the pre-trained output 320 is provided to the loss function 312 for identifying loss associated with the complex machine learning model 314. Although FIG. 3 illustrates the ground truth input to a pre-trained network for generating a pre-trained output 320, in other embodiments, the ground truth input 310 may be compared with the complex output 316 to identify loss. Generally, the loss value is greater the more different from the ground truth. For example, in comparing pixel values associated with two outputs, the loss function generates a higher loss value when numerous pixels are different from the ground truth. When an output image is getting closer to the ground truth, the loss values generated become less and less. The loss is backpropagated to the complex machine learning model 314 to train or update the parameters of the complex machine learning model 314. An objective may be to minimize the loss to the extent possible and then the training can be completed. In this way, training may be discontinued when a state is achieved in which the output of the lean machine learning model is not causing any significant loss. As can be appreciated, the loss identified in association with the lean machine learning model 302 may be provided to the complex machine learning model 314 for training and/or the loss identified in association with the complex machine learning model 314 may be provided to the lean machine learning model 302 for training. Although loss function 312 is illustrated as a single loss function, in some cases, the loss function may be two separate and distinct loss functions that generate different loss values.

Advantageously, the example implementation 300 reduces model parameters for a lean machine learning model to be implemented at a device with limited resources. In particular, both the lean machine learning model and the complex machine learning model are used in the training process, while only the lean machine learning model is used at inference to generate output. Using the complex machine learning model during training enables utilization of a large number of parameters to increase capacity of the model, thereby facilitating generalization of the solution to be accurate over diverse real examples. The complex machine learning model with a high number of parameters includes various layers. Layers of the complex machine learning model can be used to tune layers of the lean machine learning layers and are eliminated at prediction or execution time such that only a small number of parameters exist.

As described herein, in some cases, the lean machine learning model and the complex machine learning model may be implemented in the form of an actor-critic. In this regard, the lean machine learning model may take on the actor functionality, and the complex machine learning model may take on the critic functionality and is only used during the training process.

At a high level, an actor-critic algorithm may refer to a temporal difference version of policy gradient. Generally, the actor determines which action should be taken, and the critic informs the actor the strength of the action and how it should adjust. In some cases, the learning of the actor is based on policy gradient approach, and the critic evaluates the action produced by the actor by computing a value function. In this way, an actor takes as input a state and outputs a best action (for a given state) by learning an optimal policy (policy-based). The critic evaluates the action by computing a value function (value based). Generally, the goal is to train a model that chooses actions based on a policy that maximizes expected return. Both the actor and the critic can improve over time. For instance, the actor learns to produce better actions, and the critic improves on evaluating those actions. In some cases, the training of the actor and critic networks is performed separately and uses gradient ascent to find a global maximum and update weights of both networks.

Figure 4:
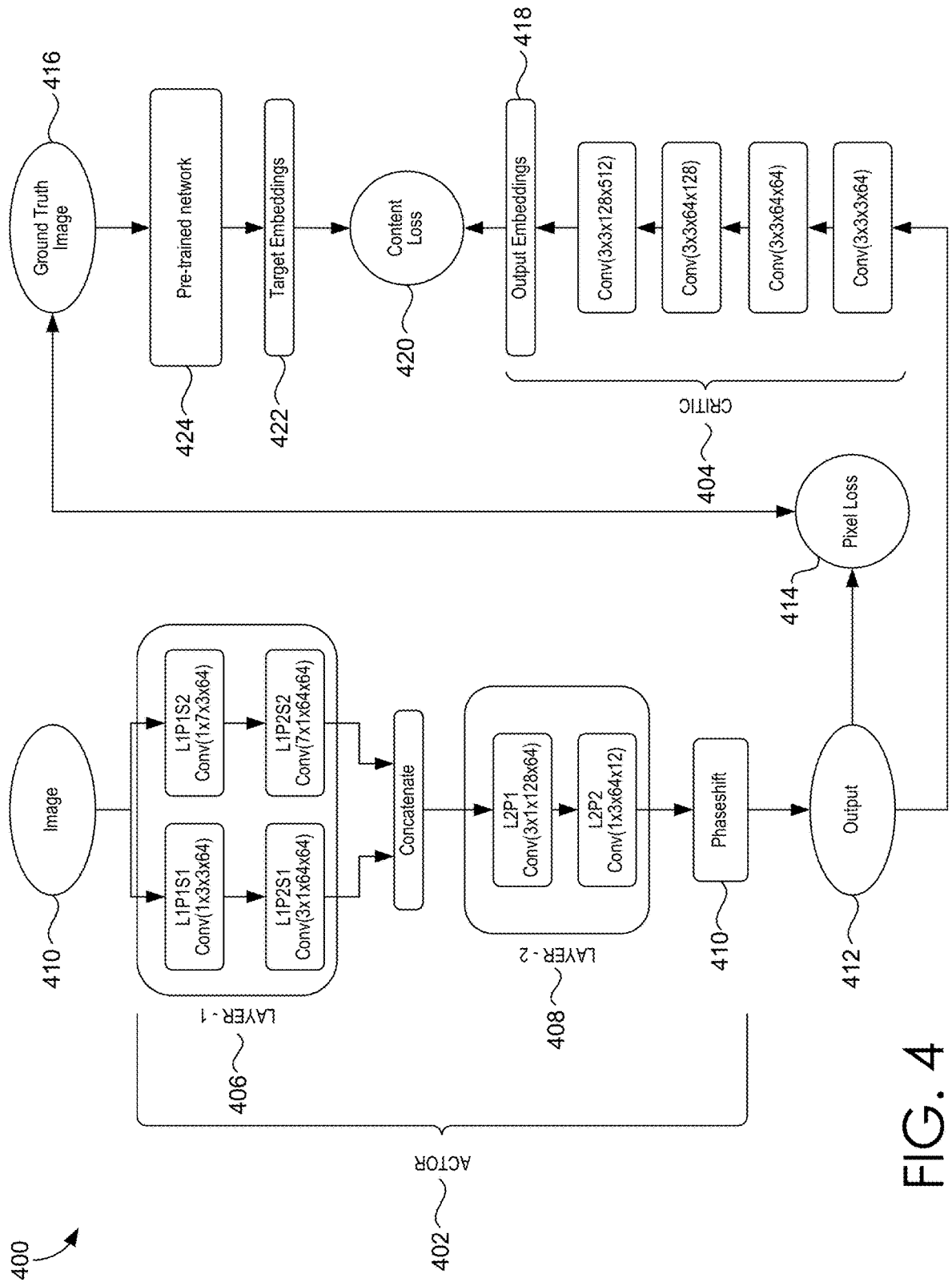
FIG. 4 depicts aspects of another example process flow for training machine learning models, in accordance with embodiments of the present disclosure.

With reference to FIG. 4, FIG. 4 provides an example 400 of an embodiment used for training via an actor-critic implementation. This example training environment includes an actor network 402 and a critic network 404. In this example, the actor network includes two convolutional layers, a first convolutional layer 406 and a second convolutional layer 408, which are further divided into smaller convolutional layers of asymmetric kernel size for better optimization. The actor network 402 takes, as input, an image 410 (e.g., a low-resolution image). The actor network 402 executes the first convolutional layer 406, the second convolutional layer 408, and a phase shift operation 410 using the output from the second convolutional layer 408 to produce an output 412, such as a super resolution image or an upscaled image. At 414, a loss function is implemented to identify or compute pixel loss based on the output 412 and a ground-truth image 416, such as an original, high-resolution image. In one example, pixel loss is computed using:

$$s = \sum_i |y_i - f(x_i)|$$

Here, s represents pixel loss which is the sum of difference of each pixel values of ground truth image (y) and output image of actor network f(x). The identified pixel loss is backpropagated to optimize the weights of the actor network 402.

In FIG. 4, the critic network 404 includes four convolutional layers, which are only exemplary in nature and number. The critic network 404 takes as input the output 412 generated by the actor network 402 and, upon executing the layers of the critic network 404, generates image features, or output embeddings 418. Such layers may facilitate learning of high-level features. To this end, the critic network 404 may extract high-level features from the image 412. Content loss 420 is computed from the output embeddings 418 and target embeddings 422. Such target embeddings correspond with the ground truth image 416. As shown, in this example, the target embeddings 422 are generated by applying a pre-trained network 424 (e.g., pre-trained VGG-16 network) to the ground truth image 416. In some cases, content loss may be computed using:

$$L_{content}^l(p, x) = \sum_{i,j} \left( F_{i,j}^l(x) - P_{ij}^l(p) \right)^2$$

Here, L represents the content loss for the lth layer between pre-trained network output and critic network output obtained by squaring the differences of each value of respective output layer. The content loss 420 is back propagated back to the critic network 404. In some cases, the content loss 420 is also back propagated to the actor network 402 to facilitate training of the actor network.

In some embodiments, a final loss may be computed. In this regard, a loss function may be a combination of actor and critic losses to use for training. In some embodiments, a proportion may be assigned to each loss. For instance, a final loss may be determined using:

$$0.8 * \text{Pixel\_Loss} + 0.1 * \text{Content\_Loss}$$

Returning to FIG. 2, the machine learning model executor 216 is generally configured to execute the lean machine learning model, as generated by model generator 224. As described herein, the machine learning model executor 216 may operate within an embedded software of an operating device having limited resources (e.g., memory). As the lean machine learning model has a minimal number of layers and parameters, the lean machine learning model is reduced in size to operate on such a limited-resource device (e.g., a printer). Advantageously, based on the training techniques described herein, the lean machine learning model performs in a same or similar manner as a more robust machine learning model with layers and parameters.

As such, the machine learning model executor 216 may access a lean machine learning model (e.g., via data store 230). Input, such as an image or a representation thereof, may be input to the lean machine learning model to produce an output, such as a bitmap for printing.

As described herein, the machine learning model executor 216 may operate in an efficient manner to further reduce resources and time associated with application of a machine learning model. In this regard, the machine learning model executor 216 may selectively apply a lean machine learning model. For example, assume an image is provided as input. In such a case, the machine learning model executor 216 may only apply the lean machine learning model to a portion of the image. Stated differently, a machine learning model may be applied only on a selected region of an input image. In various implementations, a default operation may be applied on the remaining portion of the input (e.g., the unselected portion of the image).

In such implementations, the machine learning model executor 216 may identify a region of interest for which a machine learning model (e.g., a lean machine learning model) is to be applied. A region of interest may be designated in any number of ways. In some cases, an individual or entity may specify a region of interest (e.g., using a selector or bounding box). In other cases, a region of interest may be automatically detected. As one example, a human face in an image may be specified as a region of interest. In such a case, a face is identified or designated as the region of interest. As can be appreciated, the region of interest may be determined by the machine learning model executor 216 or other component (e.g., a component or device, such as the user device, providing the input image).

In accordance with identifying a region of interest, the machine learning model executor 216 applies the lean machine learning model to the only the region of interest (e.g., pixels associated with the region of interest). The machine learning model executor 216, or another component may apply another algorithm, such as a default algorithm, to the remaining portion of the input. As one example, a lean machine learning model may be applied to a region of interest in an input image, and an image deterministic algorithm (e.g., bicubic interpolation) may be applied to the remainder of the input image. Such a specified or limited application of the lean machine learning model facilitates an efficient correction to the input image.

As can be appreciated, the outputs from application of the lean machine learning model to a region of interest of an input image and application of a default algorithm to the remainder of the input image can be merged or aggregated to generate a final image. Advantageously, the final generated image includes at least a portion of the image having a lean machine learning model applied thereto, thereby generating an enhanced image.

Advantageously, in accordance with embodiments described herein, a content aware image interpolation technique is applied, which interpolates an object of interest by deep learning network and a deterministic algorithm for the remaining portion of the image, in an efficient and effective manner. By way of example only, assume an image includes a face region of interest for which machine learning is to be applied. In this example, assume a time consumed for face detection is 0.140 seconds, and a time consumed for application of a machine learning model in the face region and bicubic application for the remainder of the region is 0.1077 seconds. In such a case, the total time consumed in association with this content-aware image interpolation technique is 0.2477 seconds. In comparison, a time taken for applying the machine learning model on the complete image may be 1.126 seconds, which is considerably more time consuming.

Figure 5:
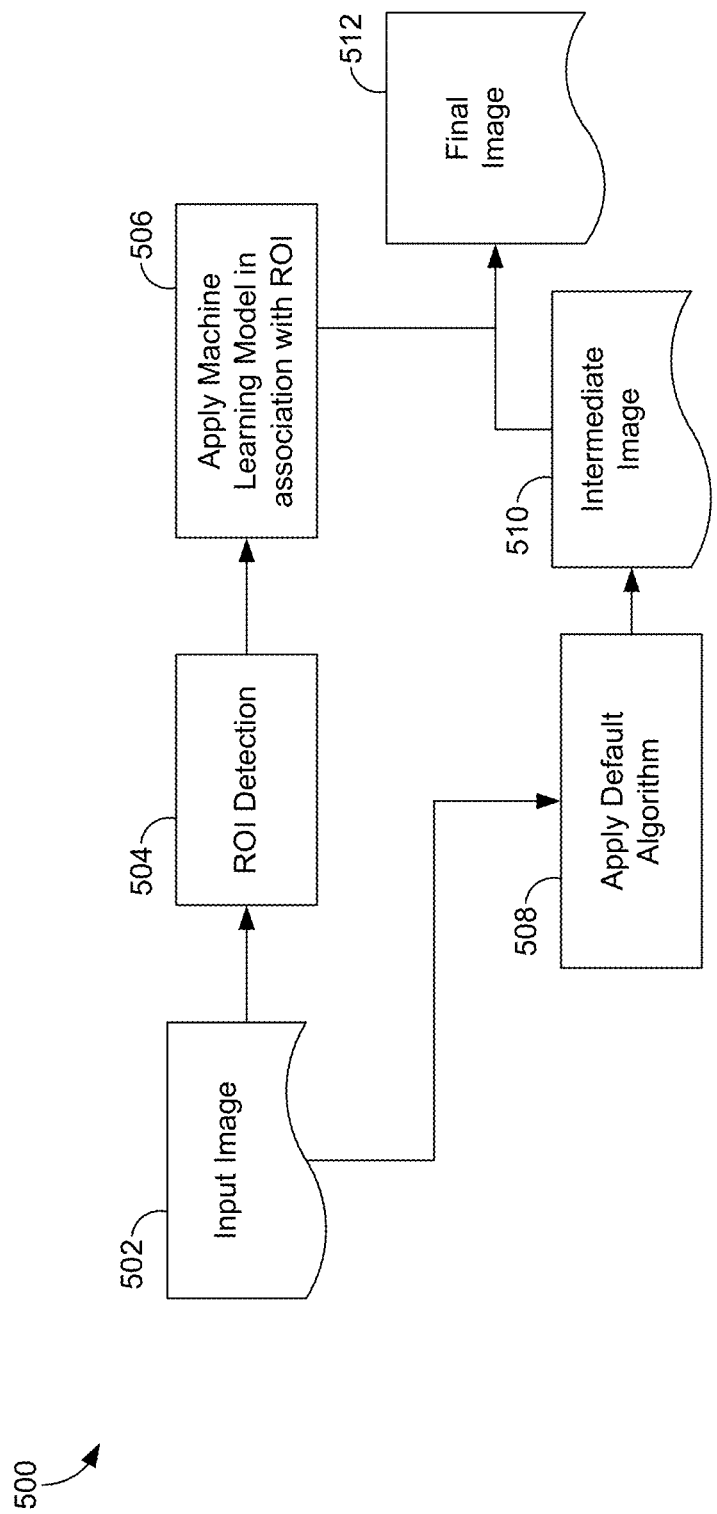
FIG. 5 depicts aspects of an example process flow for implementing a lean machine learning model, in accordance with embodiments of the present technology.

One example of process flow 500 for selectively applying a machine learning model, such as a lean machine learning model, is provided in FIG. 5. In FIG. 5, an input image 502 is provided, for example to a machine learning model executor operating via an embedded software of a device. At 504, a region of interest is detected. The region of interest can be detected in any number of ways, such as, for example, based on user selection or automated detection. In some cases, the region of interest may be specified along with the input image 502. The region of interest may vary depending on a particular task being performed by a machine learning model. At 506, a machine learning model, such as a lean machine learning model trained in accordance with embodiments described herein, is applied in association with the identified region of interest of the input image. At 508, for aspects of the image not within the region of interest, a default algorithm is applied to the input image. In some cases, the default algorithm may be applied to the entire image. Application of the default algorithm can generate an intermediate image 510, which can be aggregated with the output from application of the machine learning model to generate a final image 512 (e.g., for printing).

Figure 6:
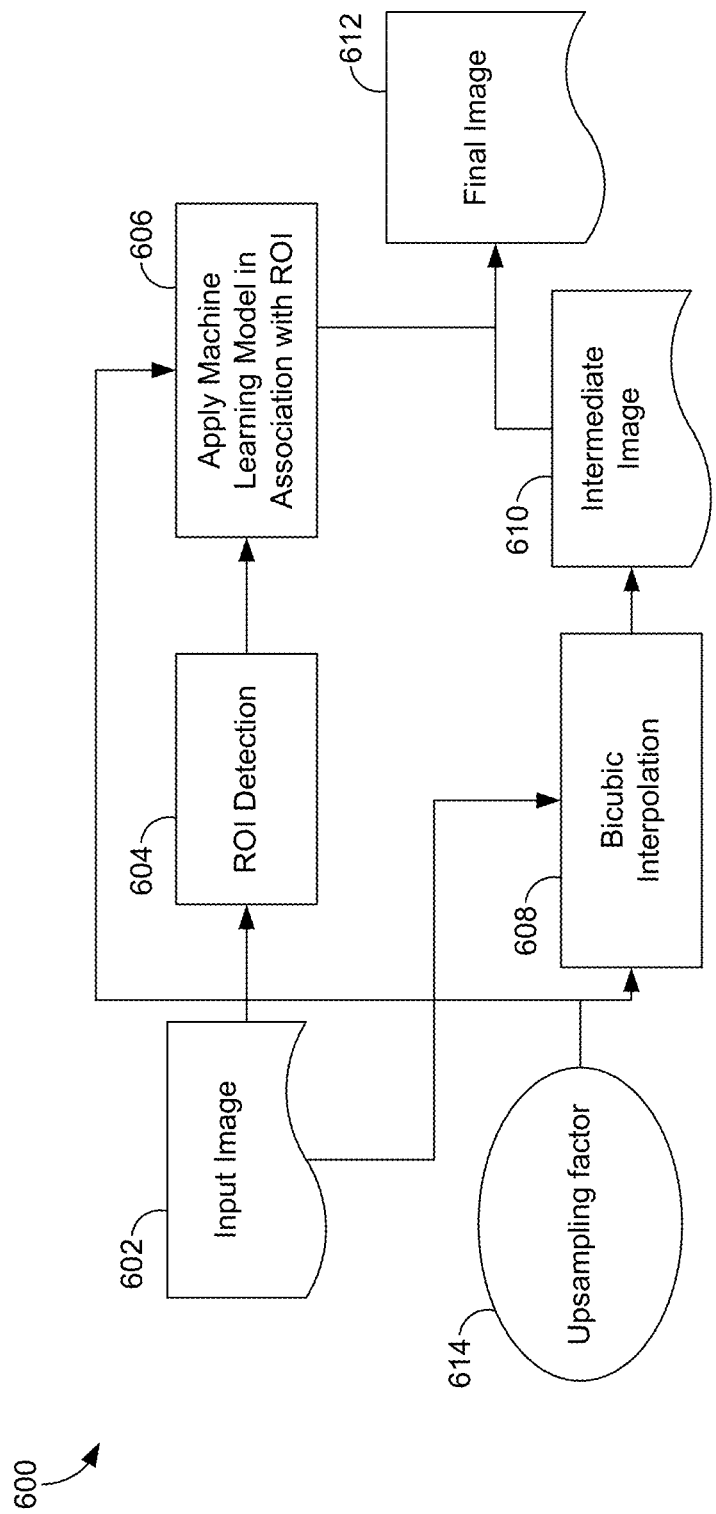
FIG. 6 depicts aspects of another example process flow for implementing a lean machine learning model, in accordance with embodiments of the present technology.

Another example of a process flow 600 for selectively applying a machine learning model, such as a lean machine learning model, is provided in FIG. 6. In FIG. 6, an input image 602 (e.g., low resolution image) is provided, for example to a machine learning model executor operating via an embedded software of a device. At 604, a region of interest is detected. The region of interest can be detected in any number of ways, such as, for example, based on user selection or automated detection. In one embodiment a region of interest detection module may be employed to identify a relevant portion of an image for which to apply machine learning based interpolation. The region of interest may vary depending on a particular task being performed by a machine learning model. For instance, a region of interest may be a human face and, as such, a human face detection model may be applied to identify a region of interest. Any region or object detection may be applied to identify portions or objects in an image for which to apply machine learning based interpolation. At 606, a machine learning model, such as a lean machine learning model trained in accordance with embodiments described herein, is applied in association with the identified region of interest of the input image (to perform ML-based interpolation). At 608, for aspects of the image not within the region of interest, a default algorithm of bicubic interpolation is applied to the input image. In some cases, the default algorithm may be applied to the entire image. Application of the default algorithm can generate an intermediate image 610, which can be aggregated with the output from application of the machine learning model to generate a final image 612 (e.g., for printing). In an upsampling example, the final image can be a super resolution image (e.g., with upsampling factor 614 applied during interpolation).

Figure 7:
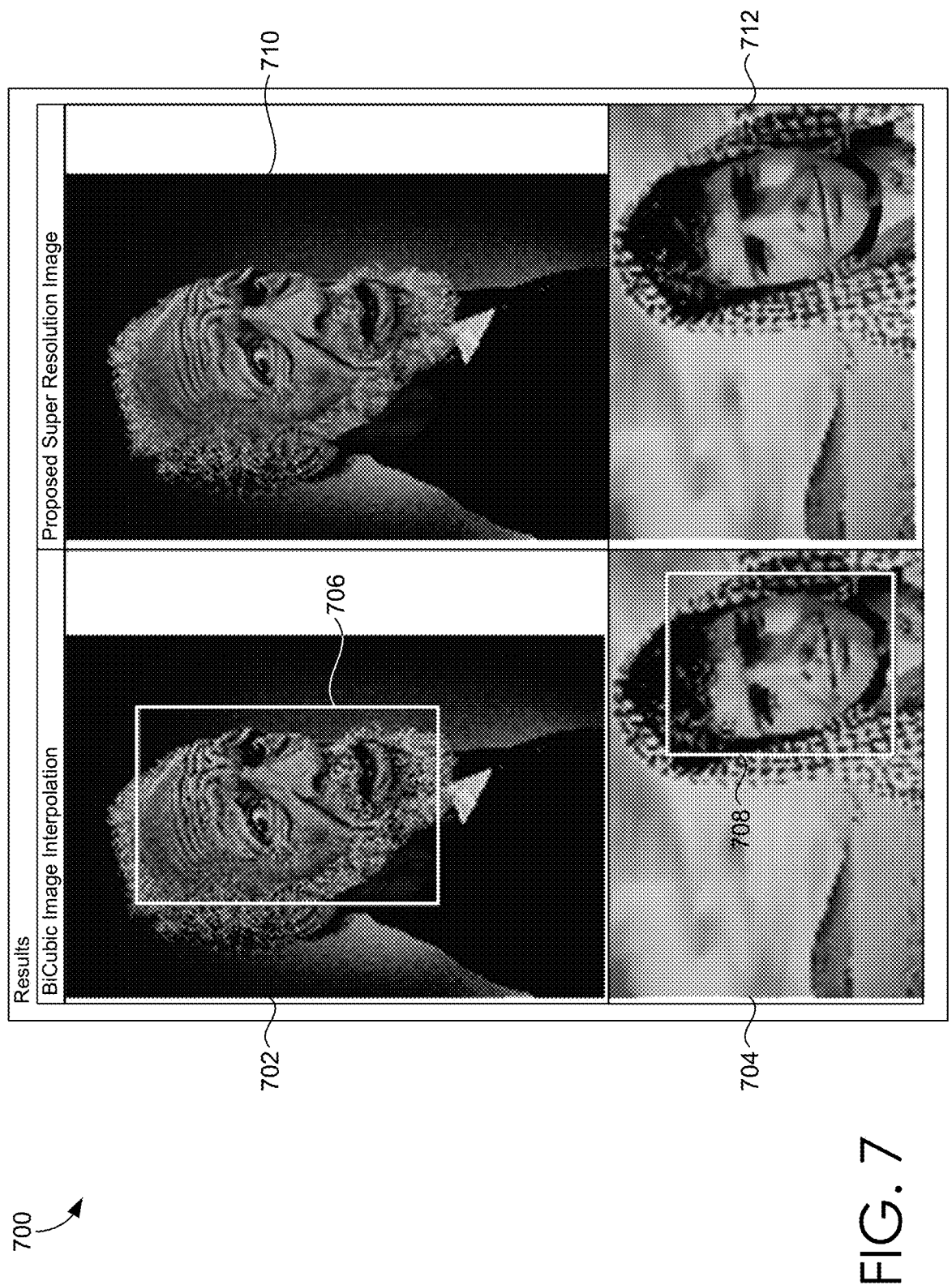
FIG. 7 provides an example of an output from implementing a machine learning model, in accordance with embodiments of the present technology.

FIG. 7 provides one example of an output from employing embodiments of the present technology. For instance, in connection with the functionality described in FIG. 6, a final super resolution image is generated by combining the results of machine learning interpolation model on a portion of an input image and interpolation of a low-resolution image using bicubic interpolation technique to at least the remainder of the input image. FIG. 7 illustrates the improvements of applying machine learning techniques to at least a portion of the image. For instance, image 702 and image 704 are images for which bicubic image interpolation is performed on the entire image. Now assume that a machine learning model is applied to a region regions of interest 706 and 708, respectively. In such a case, image 710 and 712, respectively, illustrate a final super resolution image generated by combining the results of machine learning interpolation model on the regions of interest 706 and 708 and interpretation of the low-resolution image using bicubic interpolation technique on the remainder of the image (e.g., outside the regions of interest 706 and 708).

Figure 8:
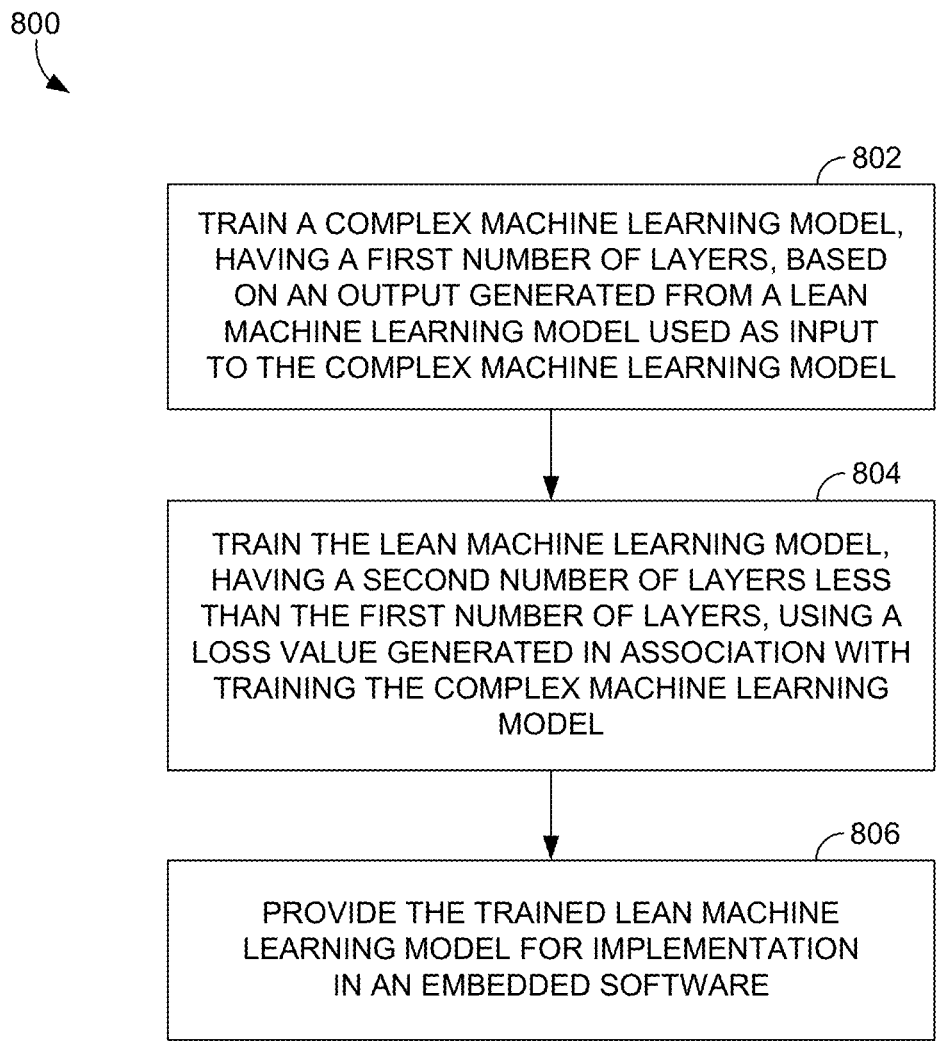
FIG. 8 illustrates an example method for training machine learning models to implement in embedded software, in accordance with embodiments of the present technology.
Figure 9:
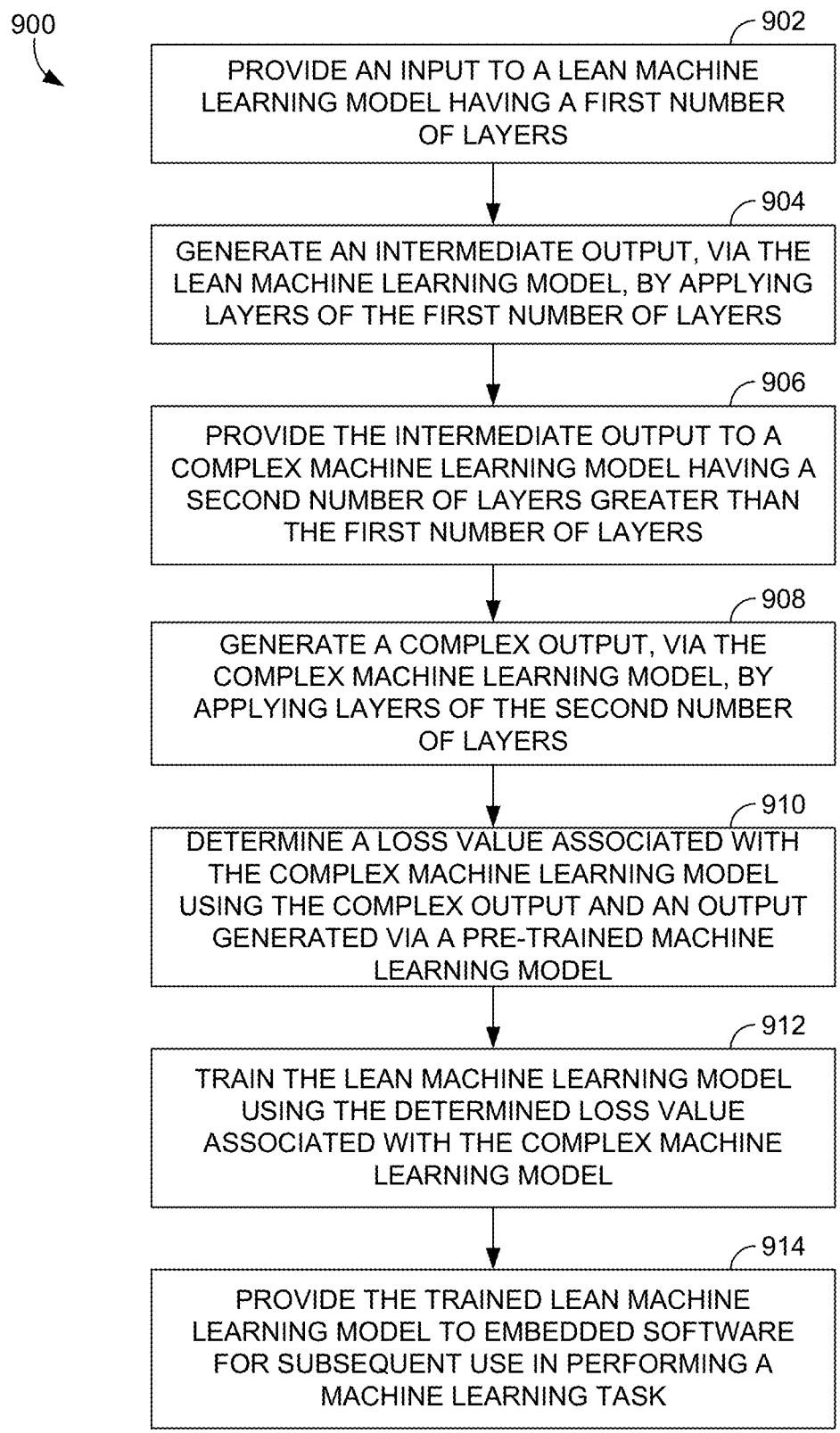
FIG. 9 illustrates another example method for training machine learning models to implement in embedded software, in accordance with embodiments of the present technology.
Figure 10:
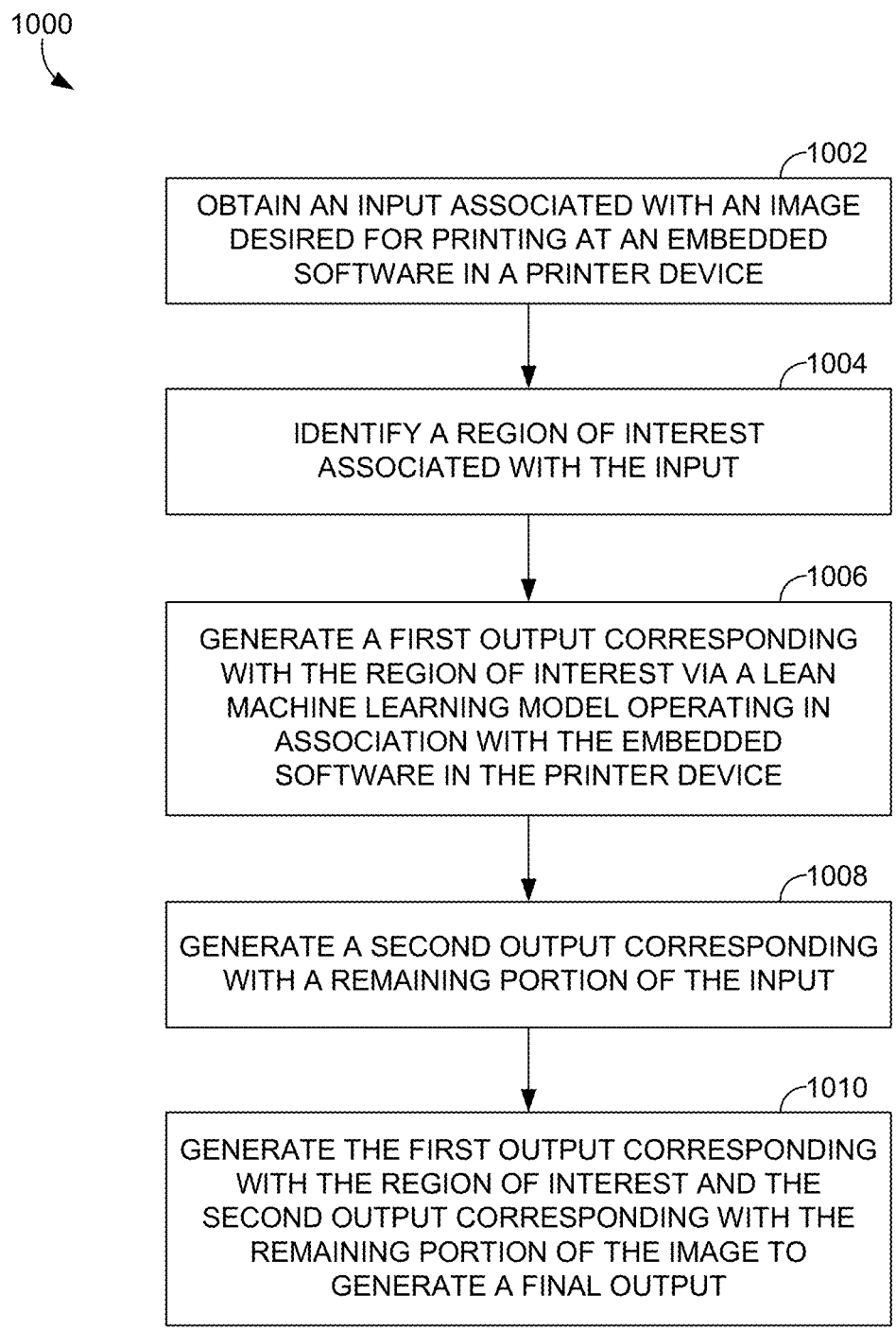
FIG. 10 illustrates an example method for facilitating implementation of lean machine learning models in embedded software, in accordance with embodiments of the present technology.

Turning now to FIGS. 8-10, FIGS. 8-10 provide illustrative flows of methods for facilitating implementation of machine learning models in embedded software, in accordance with embodiments described herein. With reference initially to FIG. 8, a process flow is provided showing an embodiment of method 800 for training a lean machine learning model, in accordance with embodiments of the present technology. At block 802, a complex machine learning model, having a first number of layers, is trained based on an output generated from a lean machine learning model used as input to the complex machine learning model. At block 804, the lean machine learning model, having a second number of layers less than the first number of layers, is trained using a loss value generated in association with training the complex machine learning model. In some embodiments, a loss value is generated using a complex output generated from the complex machine learning model and a corresponding ground truth. In other embodiments, a loss value is generated using a complex output generated from the complex machine learning model and a pre-trained output generated from applying a pre-trained machine learning model to a corresponding ground truth. In various implementations, the lean machine learning model is also trained using a loss value generated in association with the training of the lean machine learning model. Such a loss value generated in association with training the lean machine learning model may be based on the output generated from the lean machine learning model and a corresponding ground truth. The lean machine learning model may be trained until a state is achieved in which one or more output of the lean machine learning model produces minimal loss. As can be appreciated, in some implementations, the lean and complex machine learning models are implemented as part of an actor-critic algorithm, in which the lean machine learning model performs an actor functionality and the complex learning model performs a critic functionality. At block 806, the trained lean machine learning model is provided for implementation in an embedded software. In one embodiment, the embedded software is an embedded print raster image processor in a printer device.

With reference to FIG. 9, FIG. 9 provides another example 900 for training a lean machine learning model. Initially, at block 902, an input is provided to a lean machine learning model having a first number of layers. At block 904, an intermediate output is generated, via the lean machine learning model, by applying layers of the first number of layers. At block 906, the intermediate output is provided to a complex machine learning model having a second number of layers greater than the first number of layers. At block 908, a complex output is generated, via the complex machine learning model, by applying layers of the second number of layers. At block 910, a loss value associated with the complex machine learning model is determined using the complex output and an output generated by applying a pre-trained machine learning model to the corresponding ground truth. At block 912, the lean machine learning model is trained using the determined loss value associated with the complex machine learning model. As can be appreciated, the leaning machine learning model can additionally be trained based on a loss determined using the intermediate output generated via the lean machine learning model and a corresponding ground truth. As can be appreciated, in some implementations, the lean and complex machine learning models are implemented as part of an actor-critic algorithm, in which the lean machine learning model performs an actor functionality and the complex learning model performs a critic functionality. At block 914, the trained lean machine learning model is provided to embedded software for subsequent use in performing a machine learning task (e.g., a print or image editing machine learning task). In some embodiments, the embedded software is an embedded print raster image processor. Such an embedded print RIP can be installed in a printer.

With reference to FIG. 10, FIG. 10 provides an example 1000 for implementing a lean machine learning model in association with embedded software. Initially, at block 1002, an input associated with an image desired for printing is obtained at an embedded software in a printer device. For instance, an input may be in the form of an image for printing. At block 1004, a region of interest associated with the input is identified. Such a region of interest can be a portion of input that is identified based on a user selection or automatically detected via an algorithm (e.g., an object detection algorithm). At block 1006, a first output corresponding with the region of interest is generated via a lean machine learning model operating in association with the embedded software in the printer device. As described herein, a lean machine learning model may be trained in association with training a complex machine learning model to provide robustness in performance. The lean machine learning model, however, includes a lesser number of layers as compared to the complex machine learning model, thereby enabling the lean machine learning model to operate at a resource-constrained device. In some cases, the lean machine learning model modifies pixel values associated with the region of interest. The lean machine learning model may function to provide any type of edit, such as applying makeup or overlays, upsampling, object remove, blurring, color changes, etc. At block 1008, a second output corresponding with a remaining portion of the input is generated. Such an output can be generated using a deterministic algorithm, such as a bicubic algorithm. As can be appreciated, the second output is generally generated independent of any machine learning model such that the output is more efficiently generated. At block 1010, the first output corresponding with the region of interest and the second output corresponding with the remaining portion of the image are aggregated to generate a final output. In one embodiment, the final output is provided for printing via the printer device. For instance, the final output may be in the form of a bitmap used to print an image.

Figure 11:
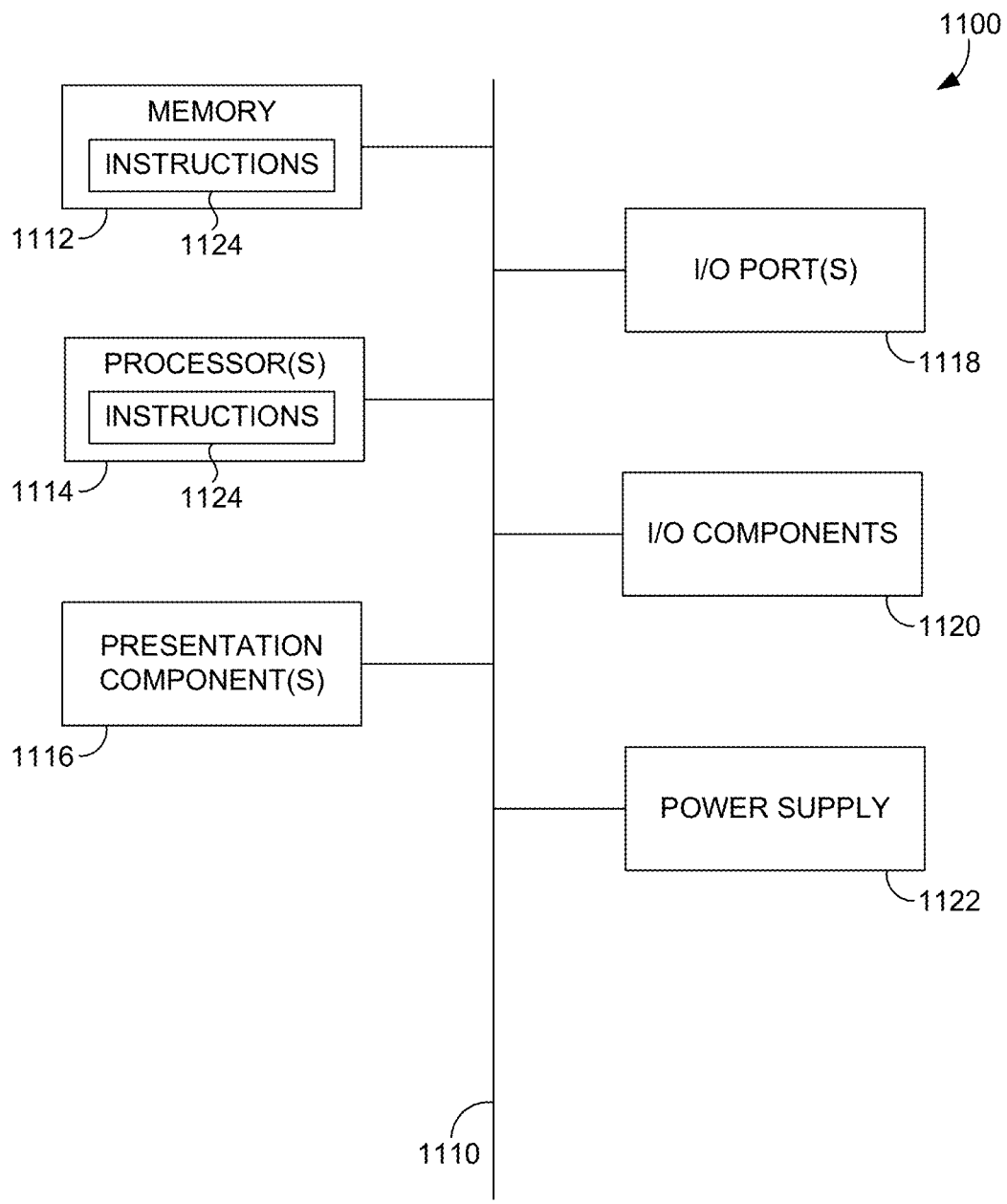
FIG. 11 is a block diagram of an example computing device in which embodiments of the present disclosure may be employed.

Having described embodiments of the present invention, FIG. 11 provides an example of a computing device in which embodiments of the present invention may be employed. Computing device 1100 includes bus 1110 that directly or indirectly couples the following devices: memory 1112, one or more processors 1114, one or more presentation components 1116, input/output (I/O) ports 1118, input/output components 1120, and illustrative power supply 1122. Bus 1110 represents what may be one or more busses (such as an address bus, data bus, or combination thereof). Although the various blocks of FIG. 11 are shown with lines for the sake of clarity, in reality, delineating various components is not so clear, and metaphorically, the lines would more accurately be gray and fuzzy. For example, one may consider a presentation component such as a display device to be an I/O component. Also, processors have memory. The inventors recognize that such is the nature of the art and reiterate that the diagram of FIG. 11 is merely illustrative of an exemplary computing device that can be used in connection with one or more embodiments of the present technology. Distinction is not made between such categories as "workstation," "server," "laptop," "handheld device," etc., as all are contemplated within the scope of FIG. 11 and reference to "computing device."

Computing device 1100 typically includes a variety of computer-readable media. Computer-readable media can be any available media that can be accessed by computing device 1100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 1100. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 1112 includes computer storage media in the form of volatile and/or nonvolatile memory. As depicted, memory 1112 includes instructions 1124. Instructions 1124, when executed by processor(s) 1114 are configured to cause the computing device to perform any of the operations described herein, in reference to the above discussed figures, or to implement any program modules described herein. The memory may be removable, non-removable, or a combination thereof. Exemplary hardware devices include solid-state memory, hard drives, optical-disc drives, etc. Computing device 1100 includes one or more processors that read data from various entities such as memory 1112 or I/O components 1120. Presentation component(s) 1116 present data indications to a user or other device. Exemplary presentation components include a display device, speaker, printing component, vibrating component, etc.

I/O ports 1118 allow computing device 1100 to be logically coupled to other devices including I/O components 1120, some of which may be built in. Illustrative components include a microphone, joystick, game pad, satellite dish, scanner, printer, wireless device, etc. I/O components 1120 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on computing device 1100. Computing device 1100 may be equipped with depth cameras, such as stereoscopic camera systems, infrared camera systems, RGB camera systems, and combinations of these, for gesture detection and recognition. Additionally, computing device 1100 may be equipped with accelerometers or gyroscopes that enable detection of motion. The output of the accelerometers or gyroscopes may be provided to the display of computing device 1100 to render immersive augmented reality or virtual reality.

Embodiments presented herein have been described in relation to particular embodiments which are intended in all respects to be illustrative rather than restrictive. Alternative embodiments will become apparent to those of ordinary skill in the art to which the present disclosure pertains without departing from its scope.

Various aspects of the illustrative embodiments have been described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features have been omitted or simplified in order not to obscure the illustrative embodiments.

Various operations have been described as multiple discrete operations, in turn, in a manner that is most helpful in understanding the illustrative embodiments; however, the order of description should not be construed as to imply that these operations are necessarily order dependent. In particular, these operations need not be performed in the order of presentation. Further, descriptions of operations as separate operations should not be construed as requiring that the operations be necessarily performed independently and/or by separate entities. Descriptions of entities and/or modules as separate modules should likewise not be construed as requiring that the modules be separate and/or perform separate operations. In various embodiments, illustrated and/or described operations, entities, data, and/or modules may be merged, broken into further sub-parts, and/or omitted.

The phrase "in one embodiment" or "in an embodiment" is used repeatedly. The phrase generally does not refer to the same embodiment; however, it may. The terms "comprising," "having," and "including" are synonymous, unless the context dictates otherwise. The phrase "A/B" means "A or B." The phrase "A and/or B" means "(A), (B), or (A and B)." The phrase "at least one of A, B and C" means "(A), (B), (C), (A and B), (A and C), (B and C) or (A, B and C)."

What is claimed is:

1. A computing system comprising:
   one or more processors; and
   one or more non-transitory computer-readable storage media, coupled with the one or more processors, having instructions stored thereon, which, when executed by the one or more processors, cause the computing system to:
   obtain, at an embedded print raster image processor in a printer device, an input associated with an image desired for printing;
   identify a region of interest associated with the input based on a particular task to be performed by a lean machine learning model or based on a user selection;
   generate, via the lean machine learning model operating in association with the embedded print raster image processor in the printer device, a first output corresponding with the region of interest, wherein the lean machine learning model is trained using a loss value generated in association with training a complex machine learning model having a greater number of layers than the lean machine learning model;
   generate, via the embedded print raster image processor in the printer device, a second output corresponding with a remaining portion of the input; and
   aggregate the first output corresponding with the region of interest and the second output corresponding with the remaining portion of the image to generate a final output.

2. The system of claim 1, wherein the second output is generated using a deterministic algorithm.

3. The system of claim 1 further comprising providing the final output for printing via the printer device.

4. The system of claim 1, wherein the lean machine learning model modifies pixel values associated with region of interest.

5. The system of claim 1, wherein the region of interest comprises a portion of the input that is identified using an object detection algorithm.

6. The system of claim 1, wherein the lean machine learning model performs an actor functionality and the complex learning model performs a critic functionality of an actor-critic algorithm.

7. The system of claim 1, wherein the lean machine learning model is trained until a state is achieved in which one or more output of the lean machine learning model produces minimal loss.

8. A computer-implemented method comprising:
   obtaining, at an embedded print raster image processor in a printer device, an input associated with an image desired for printing;
   identifying a region of interest associated with the input based on a particular task to be performed by a lean machine learning model or based on a user selection;
   generating, via the lean machine learning model operating in association with the embedded print raster image processor in the printer device, a first output corresponding with the region of interest, wherein the lean machine learning model is trained using a loss value generated in association with training a complex machine learning model having a greater number of layers than the lean machine learning model;
   generating, via the embedded print raster image processor in the printer device, a second output corresponding with a remaining portion of the input; and
   aggregating the first output corresponding with the region of interest and the second output corresponding with the remaining portion of the image to generate a final output.

9. The computer-implemented method of claim 8, wherein the second output is generated using a deterministic algorithm.

10. The computer-implemented method of claim 8 further comprising providing the final output for printing via the printer device.

11. The computer-implemented method of claim 8, wherein the lean machine learning model modifies pixel values associated with region of interest.

12. The computer-implemented method of claim 8, wherein the region of interest comprises a portion of the input that is identified using an object detection algorithm.

13. The computer-implemented method of claim 8, wherein the lean machine learning model performs an actor functionality and the complex learning model performs a critic functionality of an actor-critic algorithm.

14. The computer-implemented method of claim 8, wherein the lean machine learning model is trained until a state is achieved in which one or more output of the lean machine learning model produces minimal loss.

15. One or more computer-readable media having a plurality of executable instructions embodied thereon, which, when executed by one or more processors, cause the one or more processors to perform a method comprising:
    obtaining, at an embedded print raster image processor in a printer device, an input associated with an image desired for printing;
    identifying a region of interest associated with the input based on a particular task to be performed by a lean machine learning model or based on a user selection;
    generating, via the lean machine learning model operating in association with the embedded print raster image processor in the printer device, a first output corresponding with the region of interest, wherein the lean machine learning model is trained using a loss value generated in association with training a complex machine learning model having a greater number of layers than the lean machine learning model;
    generating, via the embedded print raster image processor in the printer device, a second output corresponding with a remaining portion of the input; and
    aggregating the first output corresponding with the region of interest and the second output corresponding with the remaining portion of the image to generate a final output.

16. The media of claim 15, wherein the second output is generated using a deterministic algorithm.

17. The media of claim 15 further comprising providing the final output for printing via the printer device.

18. The media of claim 15, wherein the lean machine learning model modifies pixel values associated with region of interest.

19. The media of claim 15, wherein the region of interest comprises a portion of the input that is identified using an object detection algorithm.

20. The media of claim 15, wherein the lean machine learning model performs an actor functionality and the complex learning model performs a critic functionality of an actor-critic algorithm.

* * * * *